United States Patent
Boys et al.

(10) Patent No.: US 11,652,367 B2
(45) Date of Patent: May 16, 2023

(54) INDUCTIVE POWER SYSTEM SUITABLE FOR ELECTRIC VEHICLES

(71) Applicant: Auckland UniServices Limited, Auckland (NZ)

(72) Inventors: John Talbot Boys, Takapuna (NZ); Grant Anthony Covic, Mount Albert (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 0 days.

(21) Appl. No.: 15/324,736

(22) PCT Filed: Jul. 9, 2015

(86) PCT No.: PCT/NZ2015/050088
§ 371 (c)(1),
(2) Date: Jan. 9, 2017

(87) PCT Pub. No.: WO2016/007024
PCT Pub. Date: Jan. 14, 2016

(65) Prior Publication Data
US 2017/0207656 A1 Jul. 20, 2017

(30) Foreign Application Priority Data
Jul. 9, 2014 (NZ) ........................ 627280

(51) Int. Cl.
*H02J 50/10* (2016.01)
*H01F 38/14* (2006.01)
(Continued)

(52) U.S. Cl.
CPC ............ *H02J 50/10* (2016.02); *B60L 53/122* (2019.02); *B60L 53/126* (2019.02); *H01F 38/14* (2013.01);
(Continued)

(58) Field of Classification Search
CPC . H01F 38/14; H02J 50/10; H02J 7/025; H02J 5/005; H02J 17/00; H02M 5/458;
(Continued)

(56) References Cited

U.S. PATENT DOCUMENTS 4,331,225 A 5/1982 Bolger et al.
4,836,344 A 6/1989 Bolger
(Continued)

FOREIGN PATENT DOCUMENTS

WO WO-2006118474 11/2006
WO WO-2008140333 A2 11/2008
(Continued)

OTHER PUBLICATIONS

"International Application No. PCT/NZ2015/050088, International Search Report and Written Opinion dated Nov. 27, 2015", (dated Nov. 27, 2015), 11 pgs.

*Primary Examiner* — Rexford N Barnie
*Assistant Examiner* — Brian K Baxter
(74) *Attorney, Agent, or Firm* — Pilloff Passino & Cosenza LLP; Martin J. Cosenza

(57) ABSTRACT

A circuit for energizing a magnetic flux coupling apparatus has a pick-up coil for receiving power inductively, a storage capacitor for storing energy from the received power, and an inverter for supplying electrical energy from the storage capacitor to the magnetic flux coupling apparatus. The circuit allows power transfer to a load to be supplied by the flux coupling apparatus to exceed the power received from the pick-up.

21 Claims, 5 Drawing Sheets

(51) Int. Cl.
*B60L 53/122* (2019.01)
*B60L 53/126* (2019.01)
*H02J 50/40* (2016.01)
*H02J 50/12* (2016.01)
*H02M 5/458* (2006.01)

(52) U.S. Cl.
CPC .............. *H02J 50/12* (2016.02); *H02J 50/40* (2016.02); *H02M 5/458* (2013.01); *B60L 2210/20* (2013.01); *Y02T 10/70* (2013.01); *Y02T 10/7072* (2013.01); *Y02T 90/12* (2013.01); *Y02T 90/14* (2013.01)

(58) Field of Classification Search
CPC ............. B60L 2210/20; Y02T 10/7005; Y02T 10/7072; Y02T 10/7094; Y02T 90/122; Y02T 90/14
USPC ........................................................ 307/104
See application file for complete search history.

(56) References Cited

U.S. PATENT DOCUMENTS

| | | | | |
|---|---|---|---|---|
| 6,089,362 | A * | 7/2000 | Takasan | B60L 5/005 191/10 |
| 6,118,676 | A * | 9/2000 | Divan | H02M 5/458 363/34 |
| 9,236,771 | B2 * | 1/2016 | Toncich | H02J 50/90 |
| 9,356,474 | B2 * | 5/2016 | Urano | H02J 5/005 |
| 9,641,223 | B2 * | 5/2017 | Miwa | B60L 53/122 |
| 9,847,675 | B2 * | 12/2017 | Miwa | H04B 5/0093 |
| 10,615,849 | B2 * | 4/2020 | Miwa | B60L 53/122 |
| 2003/0001516 | A1 * | 1/2003 | Newman, Jr. | H05B 41/282 315/291 |
| 2006/0187607 | A1 * | 8/2006 | Mo | A61N 2/006 361/143 |
| 2007/0152603 | A1 * | 7/2007 | Nerone | H05B 41/2886 315/247 |
| 2009/0322307 | A1 * | 12/2009 | Ide | H02J 5/005 323/355 |
| 2010/0007307 | A1 * | 1/2010 | Baarman | H02J 5/005 320/108 |
| 2011/0094075 | A1 * | 4/2011 | Lee | B60L 11/1805 29/25.41 |
| 2011/0115430 | A1 * | 5/2011 | Saunamaki | H02J 7/025 320/108 |
| 2011/0187317 | A1 * | 8/2011 | Mitake | H02J 50/70 320/108 |
| 2011/0254377 | A1 * | 10/2011 | Wildmer | H02J 50/10 307/104 |
| 2012/0112552 | A1 * | 5/2012 | Baarman | H02J 7/025 307/104 |
| 2012/0217111 | A1 * | 8/2012 | Boys | H01F 38/14 191/10 |
| 2012/0248892 | A1 * | 10/2012 | Covic | H01F 38/14 307/104 |
| 2012/0318586 | A1 * | 12/2012 | Atarashi | B60L 50/40 180/2.1 |
| 2013/0020163 | A1 * | 1/2013 | Asplund | B60L 3/0046 191/22 C |
| 2013/0043735 | A1 * | 2/2013 | Low | H04B 5/0075 307/104 |
| 2013/0193276 | A1 * | 8/2013 | Hunter | G01S 1/02 246/122 R |
| 2013/0214610 | A1 * | 8/2013 | Tseng | H01F 38/14 307/104 |
| 2013/0293189 | A1 * | 11/2013 | Low | H01F 38/14 320/108 |
| 2014/0015327 | A1 * | 1/2014 | Keeling | B60L 53/305 307/104 |
| 2014/0029308 | A1 * | 1/2014 | Cojocaru | H01G 4/38 363/13 |
| 2014/0030984 | A1 * | 1/2014 | Wagoner | H03K 17/689 455/73 |
| 2014/0042821 | A1 * | 2/2014 | Boys | H04B 5/0037 307/104 |
| 2014/0062181 | A1 * | 3/2014 | Bohori | H02J 7/025 307/9.1 |
| 2014/0112614 | A1 * | 4/2014 | Steinberg | G01M 5/0033 385/13 |
| 2014/0232197 | A1 * | 8/2014 | Keeling | H02J 50/90 307/83 |
| 2014/0239712 | A1 * | 8/2014 | Yoon | B60L 1/00 307/10.1 |
| 2014/0300206 | A1 * | 10/2014 | Moes | H02J 7/025 307/104 |
| 2014/0345492 | A1 * | 11/2014 | Fujito | H02P 27/06 105/61 |
| 2015/0008751 | A1 * | 1/2015 | Widmer | H02J 50/12 307/104 |
| 2015/0054345 | A1 * | 2/2015 | Monat | H02J 50/10 307/104 |
| 2015/0246614 | A1 * | 9/2015 | Dames | B60L 5/005 191/10 |
| 2015/0246620 | A1 * | 9/2015 | Fukushima | B60L 53/126 307/10.1 |
| 2015/0285845 | A1 * | 10/2015 | Ichikawa | G01R 21/06 702/65 |
| 2015/0302745 | A1 * | 10/2015 | Boys | H01F 38/14 340/935 |
| 2015/0311724 | A1 * | 10/2015 | Callanan | H02J 5/00 307/104 |
| 2015/0336469 | A1 * | 11/2015 | Ladhari | H02J 7/1423 320/116 |
| 2015/0357843 | A1 * | 12/2015 | Kobayashi | H02J 7/0016 320/118 |
| 2016/0001662 | A1 * | 1/2016 | Miller | B60L 53/122 307/104 |
| 2016/0036246 | A1 * | 2/2016 | Sakai | H02J 50/05 307/104 |
| 2016/0064814 | A1 * | 3/2016 | Jang | H01Q 1/526 343/842 |
| 2016/0141882 | A1 * | 5/2016 | Ichikawa | H02J 5/005 307/104 |
| 2016/0164307 | A1 * | 6/2016 | Shibata | H02J 50/05 307/104 |
| 2016/0226400 | A1 * | 8/2016 | Boys | H02M 1/36 |
| 2017/0005399 | A1 * | 1/2017 | Ito | H01Q 7/06 |
| 2017/0085124 | A1 * | 3/2017 | Ho | H02J 9/06 |
| 2017/0201120 | A1 * | 7/2017 | Lisini | H02J 7/0068 |
| 2017/0256992 | A1 * | 9/2017 | Badr | H02J 50/70 |
| 2017/0267110 | A1 * | 9/2017 | Widmer | B60L 11/182 |

FOREIGN PATENT DOCUMENTS

| | | |
|---|---|---|
| WO | WO-2010030195 | 3/2010 |
| WO | WO-2010090539 A1 | 8/2010 |
| WO | WO-2011016736 A2 | 2/2011 |
| WO | WO-2011016737 A1 | 2/2011 |
| WO | WO-2011127449 | 10/2011 |
| WO | WO-2016007024 | 1/2016 |

* cited by examiner

INDUCTIVE POWER SYSTEM SUITABLE FOR ELECTRIC VEHICLES

PRIORITY CLAIM TO RELATED APPLICATIONS

This application is a U.S. national stage application filed under 35 U.S.C. § 371 from International Application Serial No. PCT/NZ2015/050088, which was filed 9 Jul. 2015, and published as WO2016/007024 on 14 Jan. 2016, and which claims priority to New Zealand Application No. 627280, filed 9 Jul. 2014, which applications and publication are incorporated by reference as if reproduced herein and made a part hereof in their entirety, and the benefit of priority of each of which is claimed herein.

FIELD OF THE INVENTION

This invention relates to systems for inductive power transfer. The invention has particular application to powering electric vehicles from a roadway over which the vehicles travel. It is also applicable to other wireless power applications.

BACKGROUND

The problem of providing power inductively to moving objects such as vehicles moving along a roadway has been discussed for many years, to overcome the range anxiety associated with pure electric vehicles (EVs) i.e. electric vehicles which rely solely on electric energy. The ability to provide power continuously, or at least sufficiently often, while the vehicle is travelling has many benefits. These include: minimisation of on-board energy storage and vehicle weight; and elimination of the long charging times required when available power sources are dispersed and only used when an EV's power supply is low.

Charging or powering electric vehicles inductively from a roadway has been proposed previously in paper publications. The solutions proposed for providing a roadway powered electric vehicle (RPEV) system discuss means by which small sections of roadway include embedded inductive loops which may be energised when a vehicle requiring charge is determined to be in the proximity. This eliminates the need to power large sections of highway and increases the efficiency of the system. In all cases a number of inductive loops are spaced along a highway but they are directly connected to a power supply.

For example, U.S. Pat. Nos. 4,331,225 and 4,836,344 to Bolger describe means by which an electrochemical battery may be charged as a vehicle travels along an inductive highway. In U.S. Pat. No. 4,836,344 controllable relays are used to switch on and off sections of highway transmitter modules of around 3 m in length to deliver power to a vehicle as it moves along the roadway surface. The inductive roadway modules are elongate, being oriented longitudinally in the direction of the roadway, and placed end to end along the centre of the roadway. Power control to the vehicle is enacted from the roadway side simply by temporarily switching on and off the roadway power modules as required. U.S. Pat. No. 4,331,225 by the same author describes means by which the desired vehicle receiver is lowered to ensure the air-gap between the vehicle pick-up receiver and the roadway inductive track is as small as possible during operation, while capacitor switching means is also employed to modify the pick-up tuning to compensate (and thereby regulate the output voltage of the compensated receiving coil) for any reluctance variations during driving.

The loads imposed on the system by moving vehicles can be highly variable depending upon factors such as the size of the vehicle, its state of charge, the volume of vehicles using the roadway, the speed at which they are travelling and the separation distance between vehicles. For example, a roadway may on average only need to supply relatively low power levels to light vehicles, but occasionally will need to accommodate a large fast moving truck. The truck may require a module to generate a large amount of flux very quickly, so the system as a whole must be designed to cope with this peak load despite it being relatively rare. The cost of infrastructure such as power supplies to cope with these peak loads adds greatly to system costs.

OBJECT

It is an object of the invention to provide an improved power supply circuit, apparatus or method for inductive power transfer, or a roadway powered electric vehicle system, or a vehicle or roadway for use with such a system. Alternatively it is an object to provide a useful alternative to previous proposals.

BRIEF SUMMARY OF THE INVENTION

In one aspect the disclosed subject matter provides a circuit for energising a magnetic flux coupling apparatus, the circuit comprising:
  a pick-up coil for receiving power inductively,
  a storage capacitor for storing energy from the received power,
  an inverter for supplying electrical energy from the storage capacitor to the magnetic flux coupling apparatus,
  wherein power transfer to a load to be supplied by the flux coupling apparatus may exceed the received power.

The storage capacitor may comprise a plurality of capacitors. A plurality of inverters may be provided, each inverter supplying one or more magnetic flux coupling apparatus.

In one embodiment a power regulator is provided for regulating power provided to the magnetic flux coupling apparatus. The power regulator may be provided between the storage capacitor and the inverter, or between the pick-up coil and the storage capacitor.

In another aspect the disclosed subject matter provides a method of inductive power transfer, the method comprising:
  receiving power inductively;
  storing energy from the received power in a storage means, and;
  supplying electrical energy from the storage means to a magnetic flux coupling apparatus to make power available inductively to a load.

In another aspect the disclosure provides a circuit for energising a magnetic flux coupling apparatus, the circuit comprising:
  means for receiving power inductively,
  storage means for storing energy from the received power, and
  supply means for supplying electrical energy from the storage means to the magnetic flux coupling apparatus.

Preferably the energy supplied from the storage means to the magnetic flux coupling apparatus is supplied independent of the received power.

Preferably the supply means includes means to regulate a level of power supplied to the magnetic flux coupling apparatus dependent on a power requirement or limitation of a pick-up supplied by the apparatus. The means to regulate the level or power may be provided upstream or downstream of the storage means. In one embodiment the level of power is regulated using a buck, boost, or buck-boost converter.

In one embodiment a plurality of magnetic flux coupling apparatus are supplied by the storage means.

In another aspect the invention broadly provides a system for powering a movable pick-up from a plurality of magnetic flux coupling devices, the system comprising:
 a plurality of circuits according to the preceding statement, and
 control means to selectively supply power to one or more of the flux coupling devices dependent on the power required by the pick-up.

In one embodiment the received power is received from a primary conductive path associated with a vehicle travelling surface.

A circuit of one of the preceding statements may be associated with one or more of a plurality of power transmission modules provided in or on the roadway inductively coupled to the primary conductive path, the or each power transmission module being capable of supplying power inductively to at least one electric vehicle when the vehicle is on the vehicle travelling surface in the region of that power transmission module.

The vehicle travelling surface may comprise a roadway.

In one embodiment the primary conductive path is energised at a first frequency and the power transmission modules are energised at a second frequency. The second frequency may be greater than the first frequency.

A controller may be provided for each power transmission module to selectively allow each module to make inductive power available to a vehicle when the vehicle is sufficiently near the module to receive power therefrom. In one embodiment the controller controls the quantity of power available to the vehicle.

The power available may be determined based on a power demand category of a vehicle to which power is being supplied or on the type of vehicle to which power is being supplied, or dependent on the number of vehicles on a section of vehicle surface which supports the vehicle and/or over which the vehicle may travel in use.

One or more coils are preferably provided in each power transmission module to provide a magnetic field for inductive power transfer to a vehicle.

In one embodiment the power transmission modules are tuned so that the section of the primary conductive path adjacent to each module has its reactance substantially compensated.

The primary conductive path may be buried in or adjacent to the vehicle surface.

In another aspect the disclosure provides a roadway unit for an electric vehicle inductive power system, the unit comprising an upper surface, at least one coil of electrically conductive material beneath the upper surface and configured in use to provide a magnetic field extending above the upper surface, and a connection means for receiving power from a circuit according to the preceding statement to energise the coil.

The storage means may store energy from renewable sources.

The storage means may comprise one or more capacitors or super capacitors.

The system may be bi-directional, and the energy storage means may be used to store energy received from a pick-up device.

In another aspect the disclosure provides a roadway powered electric vehicle system comprising:
 a roadway having a plurality of inductive power transmission modules, each module including, or being associated with, a circuit according to any one of the preceding statements.

In another aspect the disclosure provides a method of inductive power transfer, the method comprising:
 receiving power inductively,
 storing energy from the received power in a storage means, and
 supplying electrical energy from the storage means to a magnetic flux coupling apparatus.

Preferably the energy supplied from the storage means to the magnetic flux coupling apparatus is supplied independent of the received power.

Preferably the supply means includes means to regulate a level of power supplied to the magnetic flux coupling apparatus dependent on a power requirement or limitation of a pick-up supplied by the apparatus.

In another aspect the invention broadly provides a method for powering a movable pick-up from a plurality of magnetic flux coupling devices, the method comprising:
 receiving power inductively,
 storing the received power in a plurality of storage elements, each element being associated with a flux coupling device, and
 selectively supplying power from a storage element to one or more of the flux coupling devices as the pick-up moves over and/or between flux coupling devices.

Preferably power is supplied dependent on the power required by the pick-up.

Further aspects of the invention will be apparent from the following description.

BRIEF DESCRIPTION OF THE DRAWINGS

Examples of embodiments of the invention will be described below with reference to the accompanying drawings in which.

DETAILED DESCRIPTION

Although the description below predominantly refers to roadway and electric vehicle applications, those skilled in the art to which the invention relates will appreciate that the subject matter also has application to IPT systems in general and could be used in applications such as materials handling for example. Further information for implementing the invention may be found in International Patent Publication WO2011/016736 the contents of which are incorporated herein by reference.

In one embodiment (shown in FIGS. 1A and 1B by way of example), a succession of power supplies 101 are provided next to a roadway 100 in groups of two, and are spaced around 200 meters apart. Each power supply 101 is connected to a three phase utility supply at 50/60 Hz 400/480 V line to line and feeds a 100 meter section of roadway. Although this document primarily uses the term roadway to refer to a road, it is intended to generally include surfaces that carry or support vehicles or similar moveable objects, including for example garage floors, carparks, bus stops etc.

Figure 1A:
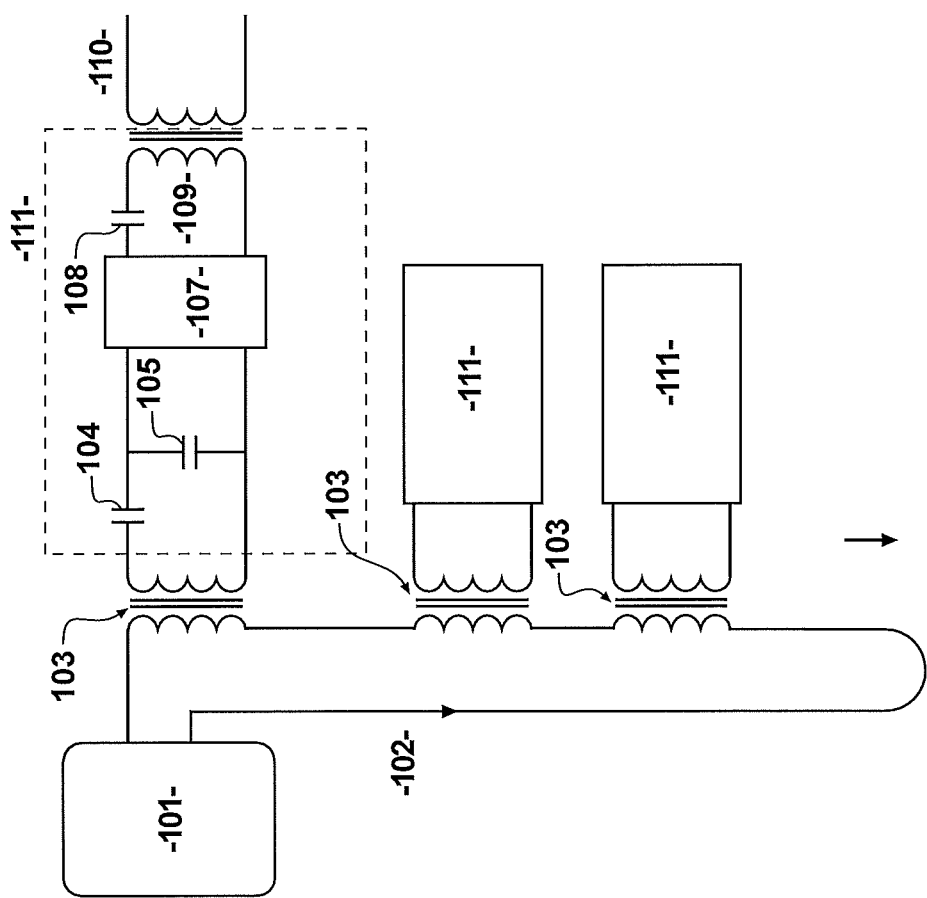
FIG. 1A is a schematic diagram of a roadway powered electric vehicle system according to one embodiment of the invention.
Figure 1B:
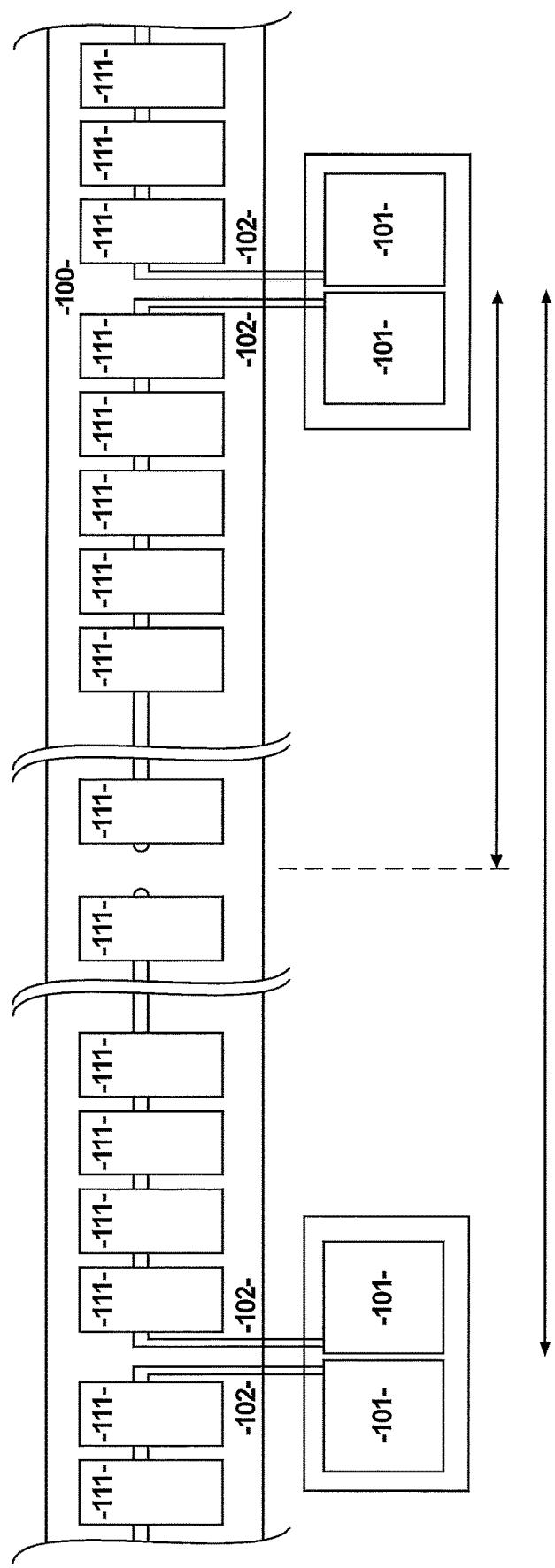
FIG. 1B is a schematic diagram of a roadway including a number of inductive power transmission modules according to one embodiment of the invention.

In the embodiment shown in FIGS. 1A and 1B, each power supply 101 is rated at 100 kW but actually produces a single phase output that drives a current of nominally 125 A at a frequency of 20 kHz in an unbroken elongate primary conductive loop 102. This current may vary from approximately 100 A to 250 A depending on the application. As shown in FIGS. 1A and 1B, each loop 102 is approximately 100 m long to thus extend along one 100 m section of roadway.

Each power supply 101 drives a succession of magnetic flux coupling devices, which are referred to herein as power transmission pads or modules 111. The modules 111 are provided in or on the roadway, and are inductively, i.e. wirelessly, coupled to the loop 102. The power transfer modules described below allow magnetic flux generation or linkage to be achieved for the purpose of inductive power transfer and have particular advantages for electric vehicle applications. The modules described are commonly (although not necessarily) provided in the form of a discrete unit which may if necessary be portable, and which typically have a greater extent in two dimensions relative to a third dimension so that they may be used in applications such as electric vehicle charging where one pad is provided on or in a ground surface and another in the vehicle. The modules may each include one or more windings. Some winding arrangements that may be used for these for pads or modules are described in International Patent Publications WO2008/140333, WO2010/090539, WO2011/016737 the contents or which are incorporated herein by reference.

The inductive coupling is achieved (as shown in both FIGS. 1A, 1B) using a two wire transmission system for the 125 A feed from the power supply 101 with pick-up coils 103 placed wherever a power module is required. The pick-up apparatus 103 may take a variety of forms. In the embodiment described the form of pick-up 103 is one such as that described in International Patent Publication WO2006/118474, the contents of which are included herein by reference. This form of pick-up has an asymmetric core magnetic structure and is referred to in this document for purposes of convenience as an S-pick-up. However, other forms of inductive power pick-up may be used. For example, a pick-up having a symmetric "E" shaped core, or "H" core, or other known shapes or arrangements may be used.

In one embodiment (such as that shown in FIG. 1B) the power transmission modules are around 0.5 m long, but they may be as large as 2 m, around 750 mm wide and 40-150 mm thick. The modules may be arranged in use so that magnetic flux travels in a pattern that is longitudinally or transversely aligned relative to the vehicle surface. Each transmission module encloses a coil of copper wire and some ferrite pieces such that when it is positioned on the roadway and driven from its power supply it can generate a magnetic field that is predominantly above the roadway surface with minimal field below the module such that wires pipes, cables etc under the roadway do not have voltages or currents induced in them. Thus the 125 A feeder and the power transmission module do not interfere with each other at all. The magnetic field provided by the module may extend across the roadway i.e. from one side to another. In another, less preferred, embodiment the field provided by a transmission module may extend longitudinally along the roadway. The power transmission module may be provided in a roadway unit by being encased in a suitable material such as concrete for example. In one embodiment the unit includes two apertures, each aperture being adapted to receive one side of the elongate primary conductive loop, and the receiver coil and core 103 are arranged in the unit so that the receiver coil may receive power inductively from the primary conductive loop. In this manner roadway units may be provided that include side walls adapted for location adjacent to side walls of a trench in a roadway, and end walls adapted to locate adjacent corresponding end walls of further units, so a modular solution is provided.

In an alternative embodiment for the roadway, and in order to given wider lateral tolerance when driving along a highway, two or more power supplies can be used each rated between 70-100 kW and preferentially spaced at regular intervals 200 m apart. Each supply is connected to a three phase utility supply at 50/60 Hz 400/480 V per phase and drives approximately 100 meters. Here again each supply is designed to drive a current of approximately 125 A at a frequency of 20 kHz in an unbroken track loop. In this second embodiment however, the output of each power supply is synchronised (with the other supplies at each defined location), and controlled to ensure the phase of the output current has a predefined separation. In one embodiment only a two phase system is desired to minimise the number of supplies/tracks and controllers, and would then require the current in each transmission line to be controlled to be 90 degrees out of phase. If in some embodiments a three phase system were found to be desirable, then three power supplies and three transmission lines may be provided with the output currents of each synchronised in both frequency and phase where the phase of each current is controlled to be separated by 120 degrees.

In another embodiment, loop 102 can be provided along the side of the roadway, and cabling can extend across the roadway (and preferably beneath the roadway surface) from the pick-up apparatus 103 to the module(s).

The output from pick-up 103 is partially series tuned using a series capacitor 104 to ensure the correct short circuit current from the coil. The combination of 103 and 104 is parallel tuned using capacitor 105 at the operating frequency of 20 kHz for this embodiment. The reflected impedance of this tuned LC combination back onto the primary supply track 102 is such that the reactance of the section of the 125 A feed in the roadway (to which the pick-up 103 is coupled) is substantially compensated on short circuit. This characteristic is selected since, under normal operating conditions (as described further below), typically only 20% or less of the power transmission modules are supplying power at any one time. The remainder are inactive, being on short circuit. In consequence, the reactance of loop 102 can be designed or controlled to a nominal value independent of exact length and does not need to be broken with additional series compensation capacitors to limit the supply voltage, as is normally the case in industrial applications feeding 50-200 m lengths. The unbroken nature of the loop removes the problem of having additional and problematic terminations present in the main roadway feed to add capacitive correction. Such terminations add loss (both from the joint termination and the losses in any added capacitance) and add to the risk of failure from aging capacitance, failure of joint terminations due to both ground movement or poor construction and aging. Terminations also add problems due to the difficultly in preventing moisture being transported between the cabling and protective sheaths into areas of capacitive correction under thermal cycling, which if present can cause failure. The absence of terminations also allows modules to be simply and easily installed, removed and replaced.

Referring to FIG. 1A, the output of parallel LC pick-up (of 103, 104 and 105) is provided to a power control circuit 107 which drives a fully series compensated power module 111 (comprising, among other elements, 108 and 109 in FIG. 1A, 108 and 109 corresponding to a power transfer module, which is sometimes herein referred to as power transmission module) embedded in or supported on the roadway 100. The inductance of the power transfer module 111 is represented by inductance 109. In this embodiment the reactance looking into the combination of components 108 and 109 is essentially zero. Thus there is the lowest possible voltage stress on components, for example switches.

As will be described further below, the power control circuit 107 enables transient load requirements of the magnetic flux coupling module to be satisfied without imposing those transients on the track 102. The power control circuit 107 also has other functions including the ability to control the magnetic field of module 109 so that it can be completely turned off or turned on or varied as required by regulating the current through capacitor 108. Adjacent modules are controlled to energise sequentially in time and synchronously in phase to prevent unwanted power transfer between adjacent modules. The operation of controller 107 is described further below.

The correct field strength required to charge a motor vehicle, bus or truck may simply be determined by limiting the current in capacitor 108 to predetermined levels corresponding to power requirements or demands for different types or categories of vehicle that may use the roadway. In one embodiment the field strength may be controlled to two, three, or more levels, each level corresponding to a power demand category of vehicles travelling along the roadway. For example, in one embodiment vehicles are categorised according to inherent electric power demand. Accordingly, a non-electric vehicle has a zero power demand, a small electric vehicle such as a car has a low power demand and a large electric vehicle such as a truck or bus has a high power demand. In another embodiment, the categorisation may be based on what a vehicle user demands rather than inherent vehicle power requirements.

The control information for determining the level of power supplied to each vehicle could in one embodiment be embedded in an RFID tag associated with each vehicle's on-board power receiver and read using additional sensors placed in advance of, or next to, each power transmission module in the roadway that are monitored by controller 107. In another embodiment control information may be sent via communications to the controller 107 based on a response from the driver as to the rate of charge the driver is prepared to pay for. In other embodiments the presence of a vehicle may be detected in other ways such as by using a sensor to sense the change in inductance of the coils in the power transmission modules as a vehicle passes over each module.

Thus the controller 107 allows power to be selectively made available at selective levels. For example, vehicles may be categorised into non-electric, light electric and heavy electric types. A sensor may then sense the vehicle category (as described further below), and the controller 107 can then control the field available to that vehicle. So if the vehicle is non-electric, no field is made available. If the vehicle is an electric bus for example, (i.e. a heavy electric vehicle), then a high field strength is provided.

Figure 2:
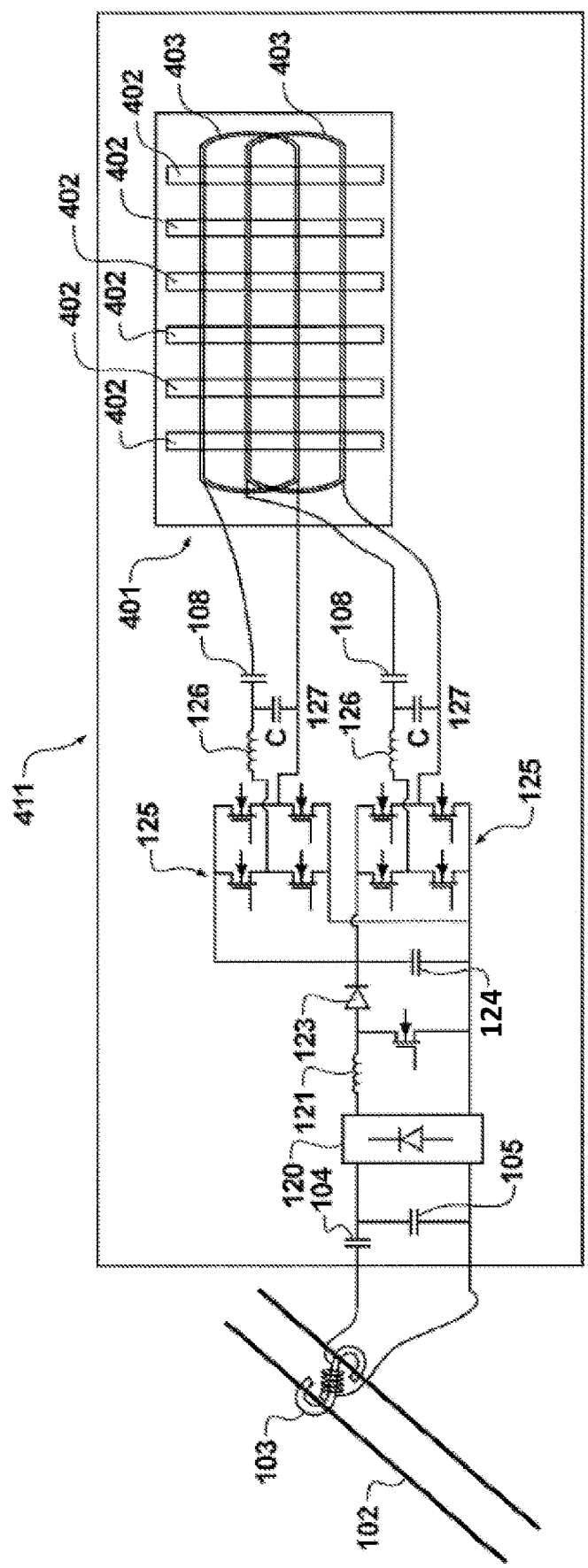
FIG. 2 is a circuit diagram of a circuit topology according to one embodiment of the invention.

Referring to FIG. 2, a circuit for a power supply from the elongate loop 102 to one or more modules is shown. In this embodiment, module 411 represents one of modules 111 of FIGS. 1A and 1B. The control circuit 107 of FIG. 1A comprises components 120-127. It will be seen that the module 401 comprises two windings. These are arranged as described in International Patent Publication WO2011/016737 with a separate invert 125 being used to drive each winding from a single pick-up 103. However, those skilled in the art will appreciate that other arrangements are possible. For example, a separate pick-up 103 may be used for each inverter 125. Also, one winding may be used as disclosed in WO2008/140333, or two windings according to WO2010/090539 may be used, driven by one inverter 125 for example.

The circuit shown in FIG. 2 provides a frequency change as part of the double IPT conversion from the primary power supply 101 to the vehicle. Although the frequency change is discussed below as being from 20 kHz to 85 kHz, those skilled in the art will appreciate that other frequencies may be used, and that the frequency may stay the same, or even decrease. In one embodiment the higher frequency for supply of power to the vehicle may be greater than 20 kHz and up to 140 kHz but preferably 85 kHz A frequency increase to 85 kHz has the advantage that the field at the modules is more likely to satisfy ICNIRP requirements, and that high efficiencies can be obtained over the short transmission distance from the inverter to the transmission module or pad. In the first conversion a power supply 101 takes power from a 3-phase utility and produces an output current of 125 A that propagates in a wire buried under the road in the form of extended loop 102. This single wire loop is coupled to pick-up 103 as described above.

The circuit has an input at 20 kHz which is rectified to DC by the diode bridge 120 and inverted back to AC at 85 kHz by one or more inverters 125 to drive a power pad or module in an IPT system at 85 kHz. At this frequency the voltage drop per metre is very high so it is impractical to use it along the roadway but here 85 kHz is used along the roadway and 85 kHz is a very short connection from the impedance conversion networks 126, 127 and 108 to the pad 401 of only a few millimetres. This use of a higher frequency at the final stage can have advantages of increased efficiency.

A further advantage of this frequency change circuit is that track 102, which is operating at 20 kHz, does not see any VAR variations present in the 85 kHz circuit, as the rectifier effectively blocks reactive VAR flow. In consequence, track 102 can ideally be tuned and where required compensated using static rather than active tuning components.

Referring to FIG. 2, and as in the previous embodiment, power modules 411 (which respectively make up a power transfer module (or also referred to herein as power transmission module) and a portion of a power transfer circuit, the output from the inverters 125 being provided to the power transfer module, the circuit from the receiver coil and core 103 to the inverters 125, inclusive, being the power transfer circuit) are inductively coupled to each transmission system 102. In the case of a two phase system (as preferred here) the coil and ferrite arrangement 401 of the power module 411 comprises two phase winding inductances (403) each having identical N turns made of Litz wire which are spaced and overlapped in bipolar fashion effectively resulting in four groups of wires spaced 0, +90, +180 and +270 degrees electrically. The general power supply arrangement shown in FIG. 2 can also be used to supply single phase pad constructions.

In the embodiment illustrated the four groups of wires are aligned transversely across the roadway i.e. in a direction from one side to the other. However, the groups of wires may in another, less preferred, embodiment be directed longitudinally along the roadway i.e. parallel to the direction of travel along the roadway. Ferrite strips 402, made by using pieces of ferrite placed end on end, are placed across the back of the power transfer module upon which coils 403 are laid. The ferrite acts to both short circuit any other potential flux paths in the roadway while also enhancing the flux above the road.

Each phase winding 403 within module part 401 is driven from its own control circuit comprising an appropriate pick-up. The module 411 may in some embodiments simply comprise part 401, the control and tuning elements being provided separately. In one embodiment the multiphase module can be constructed to be nominally 0.75 m to 1.5 m wide, and have a length between 0.5 m to 2 m (although 5 m long sections or larger may be suitable for some applications) the depth of such a module is also expected to be 40-150 mm depending on whether it is included in a roadway unit as described above in relation to the single phase embodiment. Such a roadway module or unit would preferably be positioned along the highway centre, but in some applications could be placed across a complete lane.

In the circuit of FIG. 2, power is coupled at 20 kHz from track 102 using receiver 103 and tuned using capacitors 104 and 105. This parallel resonant circuit is then input to a rectifier which controls the voltage across capacitor 124 using DC inductor 121, diode 123 and decoupling switch 122. An AC phase control approach as described in International Patent Publication WO2010/030195 may alternatively be used to provide control over power flow in this intermediate section as another means of providing a controlled voltage to capacitor 124.

The DC voltage across capacitor 124 is then switched using two standard resonant inverters 125 operating at 85 kHz, each driving an LCL converter resonant at 85 kHz comprising elements 126, 127, 108 and inductor 403 within the bipolar pad. Each inverter 125 would preferably be synchronized to drive current in the separate pad windings with 90 degrees phase shift as described earlier, although if required can vary the magnitude and or phase to suit. In some embodiments a single inverter may be used, for example to supply a single phase pad construction.

If the windings 403 of the pad are connected in series then it is also possible to operate this using a single inverter to produce a single phase time varying field suitable for power coupling. In FIG. 2, a DC inductor may be provided before the input to the inverters 125 if required.

In one embodiment capacitor 124 is used as an energy storage element, so that it can supply transient load demands which could not otherwise be supplied by track 102. If the system is bi-directional, then capacitor 124 can similarly be used to store energy received from the vehicle for return to another vehicle or return to the supply. Thus capacitor 124 may be chosen to be sufficiently large so that there can be significant changes between the power input and the power output over significant times, as will be described further below.

Making capacitor 124 large also has the advantage that it prevents further propagation of harmonics from the rectifier and controller 122 (which as described above may comprise an AC phase control arrangement described above).

Figure 3:
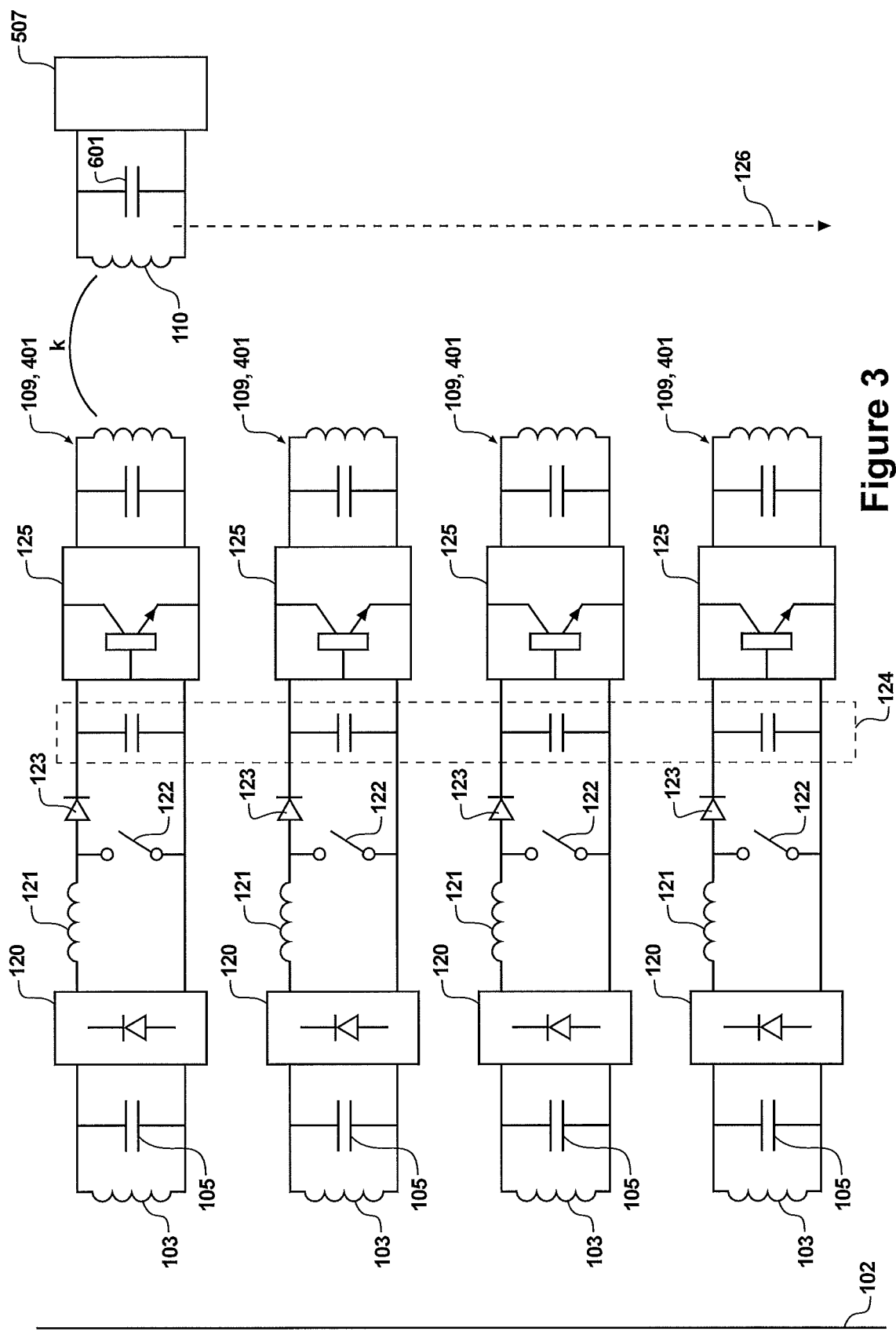
FIG. 3 is a circuit diagram of a circuit topology according to another embodiment of the invention.

The use of a system with energy storage in the form of large capacitors 124 is now described further with reference to FIG. 3. Referring to that Figure, a proximity sensor (as described elsewhere in this document) senses when moving pick-up coil 110 is sufficiently aligned with one or more stationary coils 109 or 401 and switches on inverter 125 to power coil or coils 109, 401.

Coupled power from 110 may be controlled with a secondary controller if required and is used to power the EV and/or charge its batteries represented by load 507.

The process whereby these events happen is shown in FIG. 3. Here the primary conductor loop which is provided along the roadway is vertical on the page. A vertical string of capacitors 124 are all charged and ready. Inverter 125 in the circuit at the top of FIGS. 4 and 5 supplies power to the coil 109 from charged capacitor 124 and that power is transferred magnetically to the vehicle.

As the vehicle moves in direction of travel 126, coils 109 and 110 lose their alignment and coil 103 recharges capacitor 124 for the extant condition while the next coupling circuit (i.e. the next circuit down the page in FIG. 3) on the roadway is switched on once the coils are sufficiently aligned to continue the flow of power to the vehicle. Capacitors 124 are maintained charged using decoupling switches 122 to turn the charging circuits on and off, and maintain the super-capacitors at their working voltage. It will be seen that the capacitors can be charged at the same time as they are being used as the voltage difference on discharge is quite small.

The power to drive the vehicle comes from the sequence of storage capacitors 124 along the roadway and several pads may be driven from one capacitor before that capacitor gets charged. For example, a large truck may have 5 pads each including one or more coils 110. In sequence each of these pads pass over each roadway coil 109 and each coil 109 transfers power from energy stored in capacitor 124 to the vehicle, so that all 5 pads are all powered by each roadway pad without the pad arrangement needing to be recharged from primary conductor loop 102. In this embodiment the capacitor 124 must be sufficiently large to achieve this.

Considering one embodiment by way of example, if the capacitor 124 supplies 20 kW for 10 ms as each pad passes over it then the total load on that capacitor is 20 kW for 50 ms, which is 1000 Joules. For a super-capacitor at 300 V the change in stored energy would be $$\Delta(\tfrac{1}{2}CV^2)=1000J \text{ giving:}$$

$$CV\Delta V=1000 \text{ so that } \Delta V=1000/CV$$

In a practical application with a 300V, 1F capacitor, the change in voltage $\Delta V$ in this scenario would be 1000/300=3.3 Volts or a 1% discharge, which is a completely practical result.

For a practical charging current of 10 A the charge to be replaced is Q=CV=1×3V=3 coulombs which can restored with a 10 A current for 0.3 seconds. The system could alternatively operate with a 4 A current whereby the recharge time would be 0.75 seconds. The energy stored in the super-capacitor would be $\tfrac{1}{2}CV^2$=45,000 Joules or 0.0125 kWH. By way of comparison a typical electric vehicle (e.g. a vehicle sold under the Trade Mark Nissan Leaf) uses a 27 kWH battery to store its energy at a replacement cost of perhaps $10,000 or $370/kWH. Thus the likely cost of the 0.0125 kWH super-capacitor assuming a cost differential for a super-capacitor compared with a battery of a factor of 10, is a super-capacitor for $46.00. Thus the option is economically and technically viable. Although energy storage could be achieved using a battery, this is unlikely to be feasible in this application as the cycle life must be very high—but the discharge depth will be very small—typically less than 1%. An alternative is to use a number of electrolytic capacitors in parallel.

The input frequency for the track loop 102 in this example is 21.25 kHz. Thus when this frequency is input to the ground pad a simple analogue multiplier circuit can produce 42.5 kHz by squaring the signal and then 85 kHz by squaring it again. This signal is then used to clock the inverter to give waveforms that are perfectly on frequency and identically phased so that there is no 'beating' between one pad and the next.

The amount of power made available to vehicles may need to vary significantly from one to another depending on factors such as: the state of charge of the vehicle, the instantaneous power requirement of the vehicle, and the coupling factor k between the magnetic coupling structures or coils present on the roadway and the vehicle. The field made available to a vehicle from the roadway is dependent on the current in each roadway coil 109. This current can be controlled by operation of the inverter 125, for example by controlling the duty cycle of the inverter switches. However, in practice this approach is not ideal, as it introduces unwanted harmonics. Therefore, in one embodiment a buck, boost, or buck-boost converter is used between the capacitor 124 and the inverter 125. A circuit schematic is shown in FIG. 4.

Figure 4:
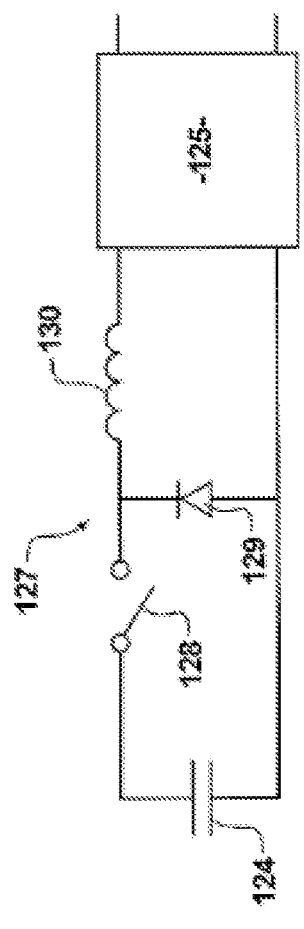
FIG. 4 is a circuit diagram for implementing power regulation according to one embodiment of the invention.

Referring to FIG. 4, a buck converter 127 is shown comprising a switch 128, diode 129 and inductor 130. The switch may be controlled in the known way to provide a controlled lower (or if a boost converter is used then a higher) voltage for use by the inverter. The voltage across the inverter determines the current flow in the pad winding (s), and power delivered by the pad is proportional to the square of the winding current. In this way, the power made available from the roadway pads can be controlled dependent on the requirements of each vehicle. In another embodiment, a buck-boost converter may be used instead to provide higher or lower voltages for use by the inverter.

Those skilled in the art will appreciate that using the topology shown herein allows a single or multiphase flux transmission pad or module to be provided without the expense of laying (and powering) more than one primary loop 102 along the roadway. Thus the topology is beneficial even if no frequency change is adopted. The ability to energise loop 102 at a low frequency—say 20 kHz—to allow it to work over long distances is clearly advantageous so that one primary can cover a significant length of roadway, while the roadway modules can be energised at 85 kHz to meet international standards for frequencies that may be used to charge electric vehicles, and to get the advantages of a higher frequency to reduce the pad size and the exposure to magnetic fields. Moreover, the use of energy storage elements to power the roadway pads means that the primary power supply for loop 102 can be lower rated, since transient demand can be supplied by charged capacitors 124. The use of energy storage also allows the system to make better use of renewable energy such as solar or wind power. Thus in one embodiment a local solar panel and/or wind generator can supply power directly to the primary loop 102 for example.

In another embodiment, multiple inverters 125, and/or multiple pads or windings 109, 401 may be powered from a single capacitor 124.

In yet another embodiment, an intermediate voltage adjustment section can be provided using switch 122, or replacing that switch with an appropriate active circuit topology, to provide control over the voltage provided on capacitor 124. For example circuitry may be provided upstream i.e. prior to capacitor 124 to implement functionality representing a buck, boost or buck-boost converter and thus provide control over the voltage present on capacitor 124. This may be used as an alternative, or in addition to the use of the circuit described with reference to FIG. 4. Switch 122 may be operated at frequencies below or above the resonant frequency of the circuit formed by 103 and 105.

Figure 5:
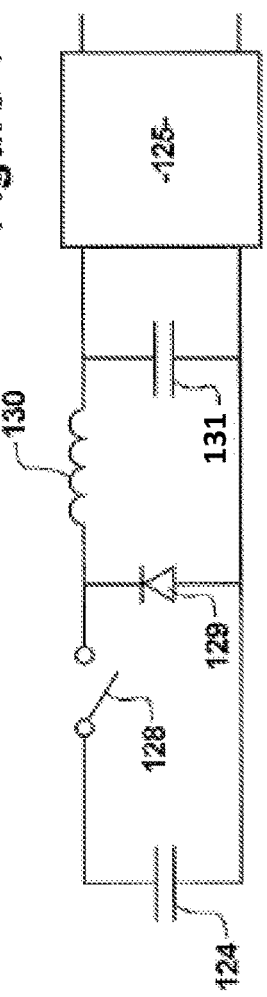
FIG. 5 is a circuit diagram for implementing power regulation according to another embodiment of the invention.

Referring now to FIG. 5, the buck converter of FIG. 4 is shown, but this time with a capacitor 131 at the input to the inverter 125. Converter 127 is used to control the voltage on capacitor 131 to provide the required voltage to the converter, and thus provide the required current in the windings of the flux coupling apparatus (i.e. the power pad). Capacitor 131 is selected to allow relatively fast changes in voltage across it, so that the current in the pad can be changed sufficiently quickly to allow the different required levels of magnetic flux to be generated. Therefore, the additional capacitor 131 is typically smaller than capacitor 124.

Figure 6:
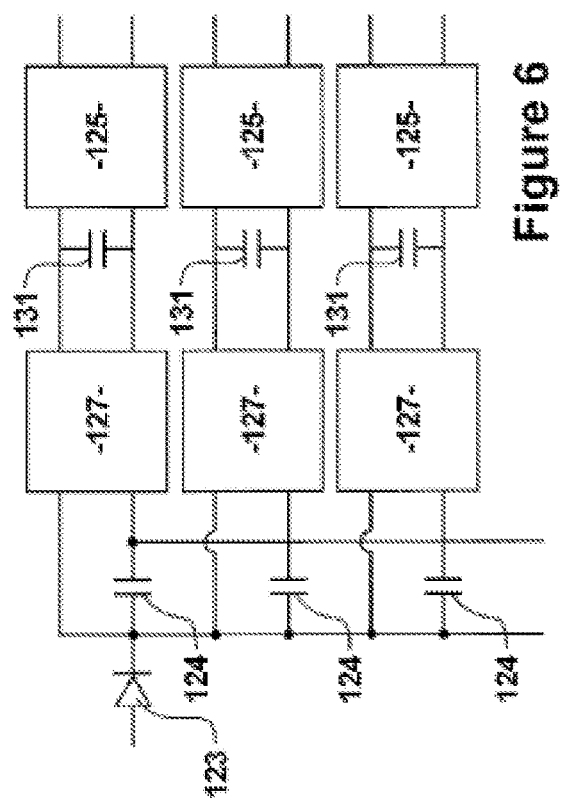
FIG. 6 is a circuit diagram of a circuit topology according to another embodiment of the invention.

In FIG. 6, an alternative embodiment is shown in which adjacent capacitors 124 are connected in parallel in groups along the roadway. The grouped capacitors may be supplied by one or multiple pick-ups 103. Although one capacitor 124 is shown associated with each inverter 125, more or fewer capacitors may be used. In one embodiment the capacitors 124 are connected in groups of five, but other groupings may be used. If five capacitors 124 are connected in parallel, over a distance of approximately five meters (i.e. the capacitors are one meter apart), then we have found that an adequate sizing for each capacitor is around 1000 microFarads at 300V. This is much smaller than the sizes referred to in preceding embodiments, but has the benefit that the group provides enough energy storage to respond to transient load demands required by the power pad, while being much less costly than using single large capacitors. The limited grouping size also has the benefit that in the event of a fault (for example a cable being shorted or cut in use) then the fault current will be constrained to a safe level.

In one embodiment the loop 102 and pick-up 103 may be located beside the roadway, along with the components up to inductor 130 (refer FIGS. 4 and 5). A DC cable may then extend under the roadway from the apparatus at the side of the roadway, to the capacitor 131 and the inverter 125 which may be provided with the power pad structure. The DC cable may provide the inductance 130 without a separate inductive component being required. This embodiment has the advantage that the large capacitance 124, and a significant quantity of the componentry, is located at the roadside from which it is accessible and, therefore, serviceable.

In use, the topology in FIG. 6 means that as a vehicle on the roadway approaches the first power pad of the group, the energy stored in the parallel connected capacitors 124 can be supplied at the required voltage level to capacitor 131 for the inverter of the first pad in the group. Capacitor 131 can charge quickly, so the voltage level will be sufficient to satisfy the transient load demand without imposing this transient demand on the primary track loop 102. Once the transient load has been satisfied, energy can then be replaced in the capacitors 124 from the track 102.

It will also be apparent that the embodiments discussed above are applicable to any IPT system in which there is a moving pick-up device i.e. the disclosure is not limited solely to roadway or EV applications.

The invention claimed is:

1. An electric vehicle inductive power system comprising:
   an elongate primary conductive loop associated with a roadway and configured to provide a magnetic field for inductive power transfer,
   a power transfer circuit for energizing a plurality of power transfer modules, the power transfer circuit comprising:
   a pick-up coil for receiving power inductively from the elongate primary conductive loop,
   a plurality of storage capacitors connected in parallel and extending along the roadway for storing energy from the inductively received power, and
   a plurality of inverters for supplying electrical energy from the plurality of storage capacitors to the plurality of power transfer modules,
   wherein a respective inverter of the plurality of inverters is coupled to a respective storage capacitor of the plurality of storage capacitors.

2. The electric vehicle inductive power system as claimed in claim 1 wherein the power transfer circuit comprises a power regulator for regulating power provided to the plurality of power transfer modules, and the power regulator is provided between the storage capacitor and the inverter.

3. The electric vehicle inductive power system as claimed in claim 1 wherein the power transfer circuit comprises a power regulator, and the power regulator regulates a level of power supplied to the plurality of power transfer modules dependent on a power requirement of a pick-up supplied by the power transfer modules.

4. The electric vehicle inductive power system as claimed in claim 3 wherein the power regulator is a DC power regulator.

5. The electric vehicle inductive power system as claimed in claim 1 wherein energy supplied from the storage capacitor to the plurality of power transfer modules is supplied independent of the inductively received power.

6. The electric vehicle inductive power system as claimed in claim 1 wherein power transfer from the plurality of power transfer modules exceed the power received inductively from the primary conductive loop.

7. The electric vehicle inductive power transfer system as claimed in claim 1 wherein the plurality of inverters are configured to drive the plurality of power transfer modules with energy from the plurality of storage capacitors, and the system is configured to transfer power to an inductively coupled load, via the power transfer modules, that exceeds the power received by the pick-up coil.

8. The electric vehicle inductive power transfer system as claimed in claim 1 wherein the system comprises a plurality of output capacitors, each of the plurality of output capacitors is connected in parallel with one of the plurality of inverters, and the plurality of output capacitors have an average capacitance that is less than an average capacitance of the plurality of storage capacitors.

9. The electric vehicle inductive power transfer system as claimed in claim 8 wherein the system comprises a DC cable, and the DC cable is configured to extend under the roadway from the pick-up coil and storage capacitor, on one side of the roadway, to the inverter and output capacitor, at a location in or under the roadway and adjacent to a power transfer module of the plurality of power transfer modules.

10. The electric vehicle inductive power transfer system as claimed in claim 8 wherein the system is configured to supply energy from the plurality of storage capacitors that are connected in parallel to one of the output capacitors.

11. The electric vehicle inductive power transfer system as claimed in claim 8, wherein the system comprises a plurality of compensating capacitors, respective compensating capacitors of the plurality of compensating capacitors being connected in parallel with respective inductance coils of the system.

12. The electric vehicle inductive power transfer system as claimed in claim 1 wherein the power transfer circuit is configured to isolate the elongate primary conductive loop from transient load demands.

13. The electric vehicle inductive power system as claimed in claim 1 wherein the power transfer circuit comprises a power converter for converting power provided to the plurality of power transfer modules, and the power converter is provided between the storage capacitor and the inverter.

14. The electric vehicle inductive power system as claimed in claim 1 wherein the plurality of storage capacitors includes at least three storage capacitors; and
   each of the three storage capacitors is connected in series with a respective buck converter.

15. The electric vehicle inductive power system as claimed in claim 1 wherein the plurality of storage capacitors includes at least five storage capacitors.

16. The electric vehicle inductive power system as claimed in claim 1, wherein the plurality of storage capacitors connected in parallel and extending along the road is a means for providing electrical energy to the plurality of inverters.

17. A method comprising:
   transferring power wirelessly from a first circuit to a second circuit;
   storing energy from the wirelessly transferred power in the second circuit; and
   wirelessly transferring power from the second circuit to a third circuit,
   wherein the power transferred from the second circuit to the third circuit exceeds the power transferred from the first circuit to the second circuit;
   wherein the method comprises rectifying AC current, via a rectifier, from the power that is transferred wirelessly from the first circuit to the second circuit, to produce a DC current,
   charging a DC capacitor with the DC current from the rectifier to store energy in the second circuit,
   converting a combined DC current, comprising the DC current from the rectifier and a DC current from the DC capacitor, to a converted DC current,
   inverting the converted DC current, to drive an induction coil, and
   wirelessly transferring power from the second circuit to the third circuit via the induction coil.

18. The method of claim 17, wherein the method comprises switching the second circuit to charge a storage capacitor in the second circuit, when the second circuit is not transferring power to the third circuit, wherein the storage capacitor is charged with energy received from the first circuit via wireless power transfer.

19. The method of claim 18, wherein the method comprises supplying energy wirelessly from the storage capacitor to the third circuit to satisfy transient demand from the third circuit without imposing transient loading on the first circuit.

20. The method of claim 17, wherein the method comprises storing energy in the second circuit with a DC storage capacitor, and switching the second circuit to transfer energy from the storage capacitor to the third circuit concurrently with the transfer of power from the first circuit to the second circuit.

21. The method of claim 17, wherein the method comprises buffering the first circuit from transient load demands imposed by the third circuit on the second circuit.

\* \* \* \* \*